(12) United States Patent
Krejci (10) Patent No.: US 10,060,401 B2
(45) Date of Patent: Aug. 28, 2018

(54) FUEL INLET FILTER FOR FUEL INJECTORS

(71) Applicant: Caterpillar Inc., Peoria, IL (US)

(72) Inventor: Adam Scott Krejci, Laredo, TX (US)

(73) Assignee: Caterpillar Inc., Deerfield, IL (US)

(*) Notice: Subject to any disclaimer, the term of this patent is extended or adjusted under 35 U.S.C. 154(b) by 105 days.

(21) Appl. No.: 15/136,545

(22) Filed: Apr. 22, 2016

(65) Prior Publication Data

US 2017/0306913 A1 Oct. 26, 2017

(51) Int. Cl.
| F02M 61/16 | (2006.01) |
| F02M 63/00 | (2006.01) |
| F02M 61/18 | (2006.01) |
| F02M 61/04 | (2006.01) |

(52) U.S. Cl.
CPC .......... F02M 61/165 (2013.01); F02M 61/04 (2013.01); F02M 61/18 (2013.01); F02M 63/0014 (2013.01)

(58) Field of Classification Search
None
See application file for complete search history.

(56) References Cited

U.S. PATENT DOCUMENTS

| 2,668,624 A * | 2/1954 | Wahlin ................ B01D 29/15 |
| | | 210/413 |
| 3,099,546 A * | 7/1963 | Smallpeice .......... B01D 29/213 |
| | | 210/85 |
| 5,186,882 A | 2/1993 | Hafner |
| 5,360,164 A | 11/1994 | Pape et al. |
| 7,673,817 B2 | 3/2010 | Brauneis et al. |
| 2013/0200003 A1 | 8/2013 | Becker et al. |
| 2015/0008271 A1 | 1/2015 | Mack |
| 2015/0041565 A1 | 2/2015 | Mueller |

FOREIGN PATENT DOCUMENTS

| EP | 1239147 A2 | 9/2002 |
| EP | 2426351 | 3/2012 |
| JP | H032700 | 1/1991 |
| WO | 0155587 A1 | 8/2001 |

\* cited by examiner

*Primary Examiner* — Benjamin M Kurtz
(74) *Attorney, Agent, or Firm* — Law Office of Kurt J. Fugman LLC (57) ABSTRACT

A method for compensating for a variable distance between two components of an apparatus for providing a fluid filtering device therebetween is provided. The method comprises placing an adjustable filtering device between two components, altering the distance between the two components, and compensating for the change in distance between the two components by varying a dimension of the adjustable filtering device.

13 Claims, 11 Drawing Sheets

FUEL INLET FILTER FOR FUEL INJECTORS

TECHNICAL FIELD

The present disclosure relates generally to fuel injectors that use fuel filters to remove particulates that may foul the workings of the fuel injector. More specifically, the present disclosure relates to fuel filters that allow for dimensional variances between different components of the fuel injector.

BACKGROUND

Fuel injection is well known in the art for injecting fuel into a combustion chamber of an engine that is subsequently mixed with air or oxygen and then combusted for powering the engine. Fuel injectors receive fuel from the fuel system of an engine that is frequently cleaned or filtered so that debris, dirt, particulates and other contaminants have been removed. However, sometimes the prefiltering of the fuel is unsuccessful in filtering out enough contaminants before reaching the fuel injector. Such contaminants then may undesirably foul the workings of the fuel injector. As a result, the performance of the fuel injector may be adversely affected and the fuel injector may stop working altogether in some instances.

One solution to this problem is to place a fuel inlet filter at the place where fuel enters the fuel injector, helping to remove any contaminants present in the fuel before it enters into the fuel injector. However, sometimes the fuel inlet is in an area where two components of the fuel injector assembly meet. For example, this junction may occur where the nozzle assembly (sometimes referred to as the case or nozzle housing) is screwed onto the body assembly (sometimes referred to as the body or the main housing) of the fuel injector. In such applications, there may be a dimensional variance between portions of the case and body since there is no tight control of this dimension. Instead, the case is tightened onto the body via threads until a predetermined torque threshold is reached, at which time, the relative movement of the case to the body ceases. As a result, a filter placed between case and body may either be overly compressed or crushed, or slop may be provided that allows fluid to bypass the filter. In either scenario, the intended purpose of providing a sufficient amount of filtered fuel is defeated.

SUMMARY OF THE DISCLOSURE

A fluid filter assembly is provided that comprises an upper housing, a lower housing, a resilient member that is operatively connected to the upper and lower housings and that is configured to bias the upper and lower housing apart, and a flexible filter mesh that is operatively connected to the lower and upper housing and that is configured to filter fluid that passes between the lower and upper housings.

A fuel injector assembly is provided that comprises a main injection assembly that defines a pressurized fuel chamber and that includes a body that defines a longitudinal axis, a nozzle assembly that includes a check valve assembly and a casing that surrounds the check valve assembly, wherein the casing is threadedly attached to the body forming a junction, a control valve assembly that includes a valve actuating mechanism, and an axially adjustable fuel filter assembly that is disposed proximate the junction of the casing and the body.

A method for compensating for a variable distance between two components of an apparatus for providing a fluid filtering device therebetween is provided. The method comprises placing an adjustable filtering device between two components, altering the distance between the two components, and compensating for the change in distance between the two components by varying a dimension of the adjustable filtering device.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Many engines now use an electronic control unit or module that manages the fuel system of the engine. More specifically, the electronic control module (ECM) meters the timing and duration of the injection of fuel into a combustion chamber. The amount of fuel injected may be altered by changing the electric signal sent to any one fuel injector unit. When a control valve assembly is present in the fuel injector, a solenoid may be used to effectuate opening and closing of the control valve, which in turn, leads to the desired amount of fuel being injected into the combustion chamber. The electric signal in such a case may be a voltage that energizes the solenoid for a precise period of time. This opens the control valve. When the signal is removed, the solenoid de-energizes and the control valve closes. The voltage signal may be a 105 volt signal in some applications. Of course, the timing of the voltage signal may also control the timing of the fuel injection.

The ECM is instrumental in controlling the injection of fuel into the combustion chamber in order to optimize various performances of the engine. One such performance is the limiting of emissions. A FRC fuel position is determined to limit the amount of fuel that is injected into a certain amount of air to prevent increasing emissions past an allowable limit. This limit is based on the boost pressure present in the air meaning that as the boost pressure increases, then the FRC fuel position also increases. The rated fuel position is also determined based on the horsepower rating of the engine. The electronic control of the rated fuel position is similar to what was once achieved using rack stops and a torque spring on a mechanically governed engine. This rated fuel position also provides the horsepower and torque curves for a specific horsepower rating. These limits are typically programmed by the engine manufacturer into the personality module of the ECM, helping to prevent tampering by the end user that could lead to undesirable emissions of the engine.

The timing of the injection may be determined based on various engine parameters including the engine load, speed etc. The ECM is able to determine the top center position of any cylinder from the signal that is provided by an engine speed or timing sensor as is known in the art. The ECM then calculates when the fuel injection should occur for any cylinder relative to the top center position. Then, the ECM provides the signal to the fuel injector at the appropriate time for causing the fuel injection into the combustion chamber of the cylinder.

Figure 1:
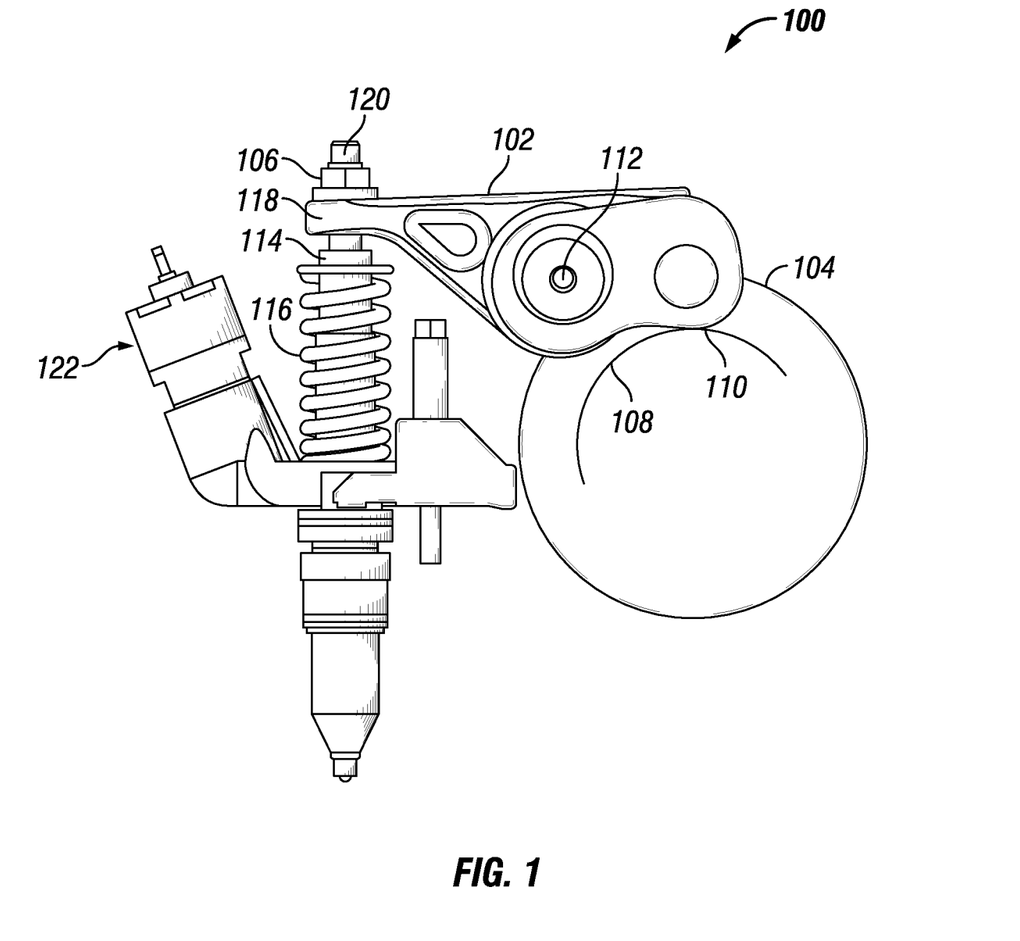
FIG. 1 is side view of a mechanical fuel injector assembly that uses a solenoid operated control valve and a cam shaft and rocker assembly that power a tappet for pressurizing fuel for injecting fuel according to one embodiment of the present disclosure.

Referring now to FIG. 1, an example of a portion of an engine that may be controlled by an ECM and that may include a fuel inlet filter assembly according to any of the embodiments discussed herein is shown. The fuel inlet filter assembly may not be shown with reference to FIGS. 1 thru 6 but will be discussed in more detail with reference to FIGS. 7 thru 11. It should be noted that the fuel injector and associated engine parts depicted in FIGS. 1 thru 6 are provided only as an example and that the configuration of a fuel injector and the manner in which fuel pressurization is achieved for injection may be altered as desired and may include anything known or that will be devised in the art including mechanically pressurized fuel injectors, hydraulically pressurized fuel injectors, common rail fuel injectors, etc. Hence, any discussion of FIGS. 1 thru 6 is merely intended to provide context and understanding on how some fuel injectors and fuel filter assemblies may work as is disclosed in the present disclosure and may not actually use such a fuel filter assembly depending on the application.

The engine is shown in FIG. 1 to comprise a fuel injector assembly 100, a rocker arm assembly 102, a cam shaft 104 and an adjustment nut 106. Though not shown in FIG. 1, the cam shaft 104 is driven by an idler gear that is in turn driven by a front gear train by the crankshaft gear. The gears of the front gear train are timed properly to provide the proper relationship between piston and valve movement. This timing is achieved by correctly aligning the timing marks of the gears during assembly. Typically, the cam shaft has three cam shaft lobes for each cylinder. Two of these lobes operate the opening and closing of the intake and exhaust valves. The third lobe 108 provides the mechanical force necessary to pressurize the fuel in the fuel injector assembly 100 as will be explained in further detail momentarily.

In operation as the cam shaft 104 rotates, the third lobe 108 contacts the roller curved follower surface 110 of the rocker arm assembly 102, which causes the rocker arm to pivot upwardly about its pivot point 112 on the right side of the pivot point 112. This causes the rocker arm to pivot downwardly on the left side of the pivot point 112, exerting force on the tappet 114 of the fuel injector assembly 100, while also compressing the return spring 116. The tappet 114 extends further into the fuel injector assembly 100 causing pressurization of the fuel. The adjustment nut 106 is located on top of the yoke 118 of the rocker arm assembly 102 that is used to connect the tappet 114 to the rocker arm assembly 102. Rotating the nut 106 causes the nut 106 to travel upwardly or downwardly on the threaded end 120 of the tappet 114, which may affect the amount of travel of the tappet or set the desired position of the plunger (not shown) in the injector. After the third lobe 108 passes the curved follower surface of the rocker arm assembly 102, the return spring 116 will cause the rocker arm on the left side to pivot upwardly and return to its original position.

The ECM (not shown) typically controls the operation of the control valve assembly 122 through four stages for this type of fuel injector assembly 100. These stages include pre-injection, injection, end-of-injection, and fill. As will be shown with reference to FIGS. 2 thru 6, the fuel injector assembly uses a plunger that is disposed in a pressurized fuel chamber defined by a barrel or housing to pressurize the fuel to a pressure suitable for injection into the combustion chamber.

Figure 2:
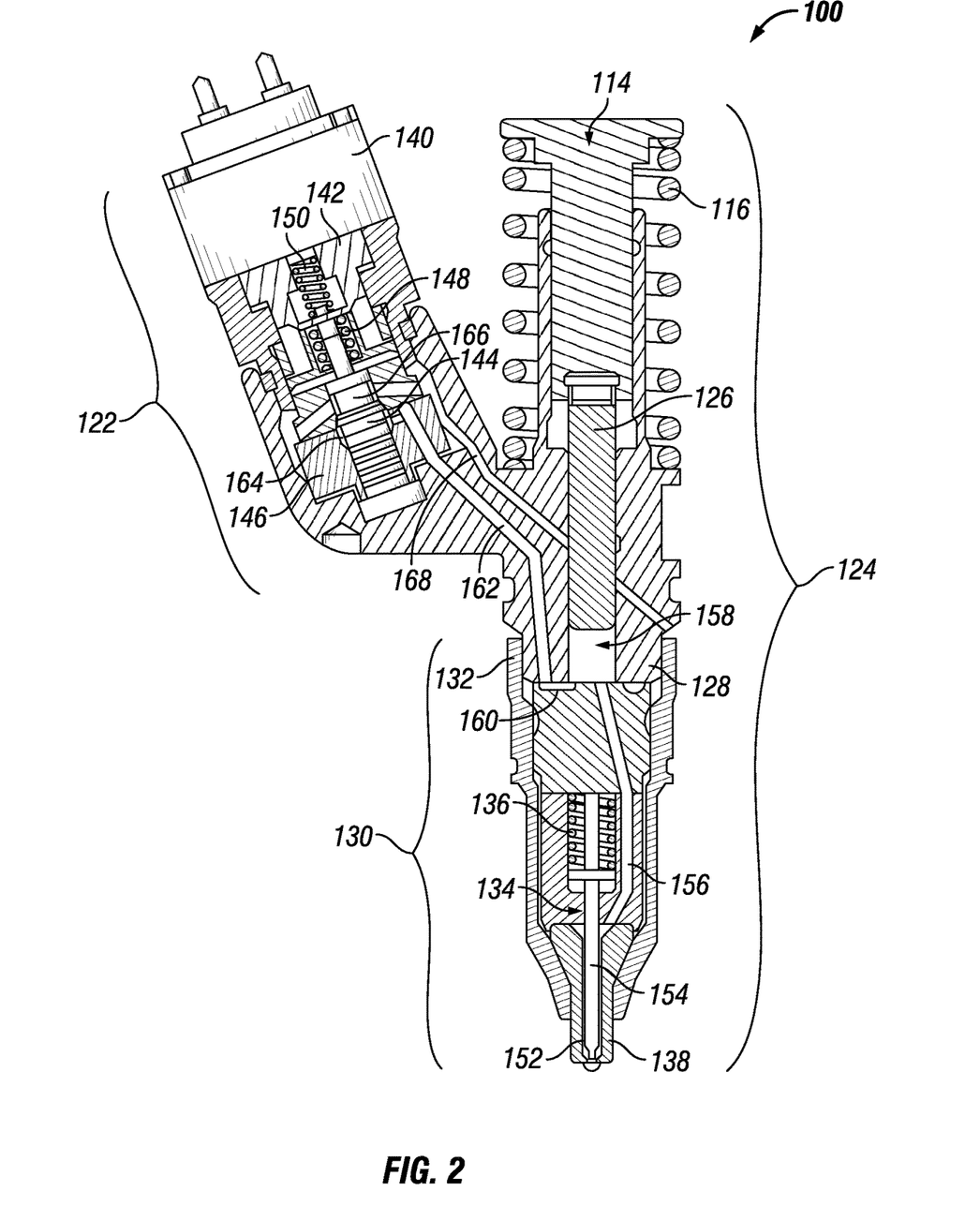
FIG. 2 is a side cross-sectional view of the fuel injector assembly of FIG. 1 showing the internal working components of the fuel injector more clearly.

Focusing now on FIG. 2, it shows the fuel injector assembly 100 includes the main injector assembly 124 and the control valve assembly 122. The components of the main injector assembly 124 include the tappet 114, the plunger 126, the housing 128 (also called the body) and the nozzle assembly 130. The nozzle assembly 130 includes a nozzle housing 132 (also called the casing), check valve assembly 134, a check valve return spring 136, and nozzle tip 138. The cartridge valve or control valve assembly 122 includes the solenoid 140, armature 142, poppet valve member 144, a valve sleeve member 146, an over-travel spring 148, and a main return spring 150.

The fuel injector assembly may be mounted in a bore disposed in the cylinder head of the engine which has an integral fuel supply passage (not shown). An injector sleeve (not shown) may also be provided that separates the fuel injector assembly from the engine coolant in the water jacket. Some engines use a stainless steel sleeve. Such sleeves may fit into the cylinder head with a light press fit.

As shown in FIG. 2, the fuel injector assembly 100 defines a series of passages that are interconnected or in fluid communication with each other and may be selectively separated from each other by the control valve 122. That is to say, the fluid communication between the various passages may be turned on and off using the control valve 122.

Starting at the nozzle tip 138, it defines an injection passage 152 that surrounds the needle 154 of the check valve assembly 134. The injection passage 152 is in fluid communication with a feed passage 156 that extends upwardly through the nozzle assembly 130 and that is in fluid communication with the pressurized fuel chamber 158 that is defined by the housing 128 of the main injector assembly 124. Immediately above this space is the plunger 126 that may move downward and pressurize the fuel as will be described in further detail later herein. A reservoir 160 is in fluid communication with the pressurized fuel chamber 158 just to the left of the feed passage 156. A first exhaust passage 162 is in fluid communication with the reservoir 160 and leads to a control valve chamber 164 that is disposed around the perimeter of the grooved portion 166 of the poppet valve member 144. This control valve chamber 164 is in fluid communication with a second exhaust passage 168 that returns to a fuel tank or reservoir (not shown) at low pressure. The poppet valve member 144 selectively interrupts the fluid communication between the first and second exhaust passages in a manner that will be described momentarily.

Figure 3:
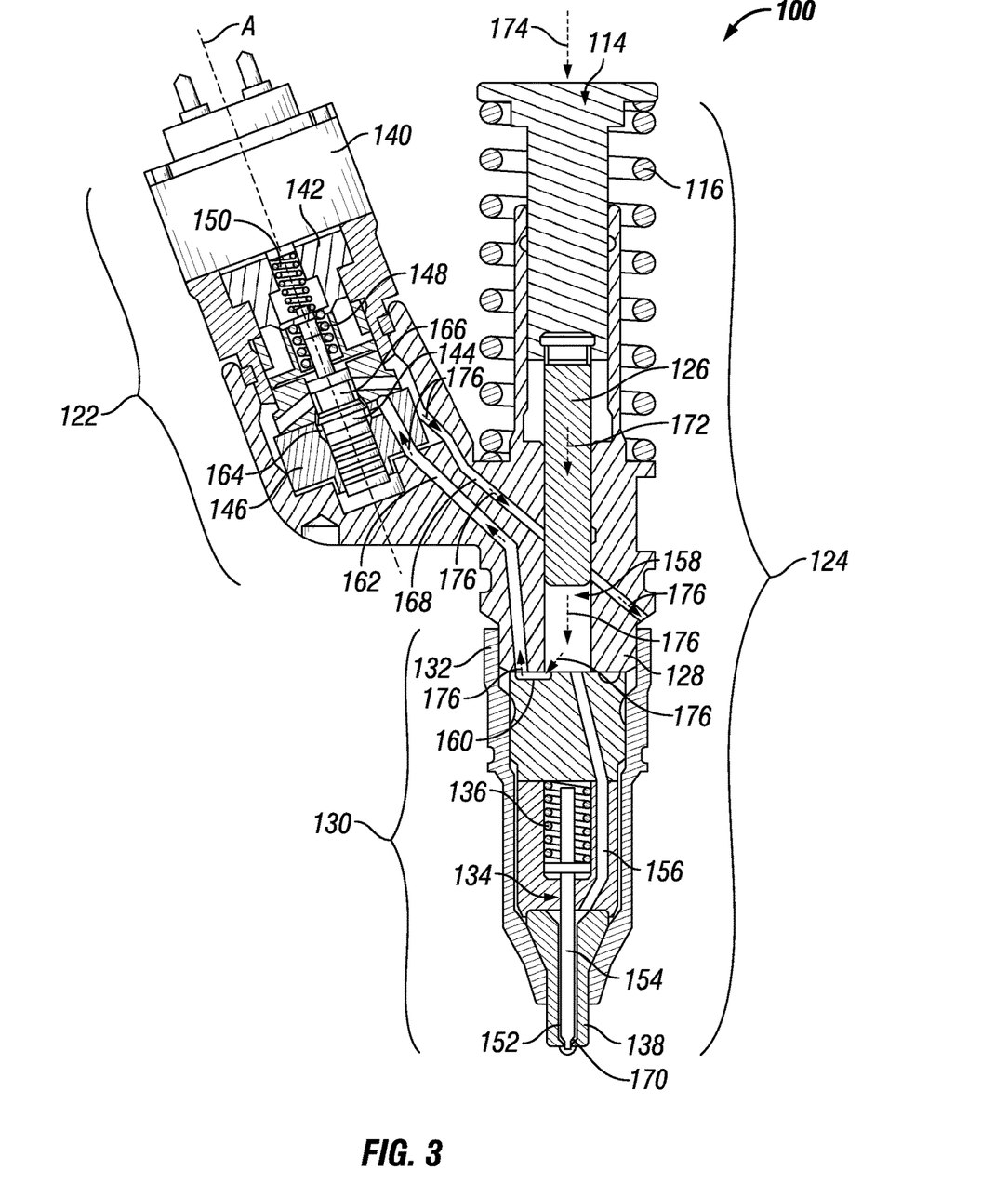
FIG. 3 depicts the fuel injector assembly of FIG. 2 in a pre-injection state.

Looking now at FIG. 3, the fuel injector assembly 100 is shown in its pre-injection configuration. Initially, the tappet 114 and plunger 126 are at their topmost position, naturally biased to this position by the return spring 116. At this position, the volume of fuel present in the pressurized fuel chamber 158 is at its greatest. At this time, the ECM does not send a voltage signal to the solenoid 140 of the control valve assembly 122, meaning that the solenoid is not energized and the poppet valve member 144, armature 142 and any other components therebetween are naturally biased by the main and over-travel return springs 150, 148 into their lowest position along the longitudinal axis A of the control valve assembly 122, which is defined by the various components such as the poppet valve member 144 that have substantially cylindrical configurations. Other configurations of these components are considered within the scope of the present disclosure.

As a consequence, the groove 166 of the poppet valve member 144 is in simultaneous fluid communication with the first exhaust passage 162, control valve chamber 164, and second exhaust passage 168. This establishes an open position for the poppet valve member 144 and control valve assembly 122 as will now be explained. The check valve 134 of the tip 138 is naturally biased to a closed position by the check valve return spring 136. This check valve 134 remains closed until enough fuel pressure is supplied to the angled surface 170 of the needle 154 of the check valve. As the plunger 126 and tappet 114 move downwards (see arrows 172, 174) into the pressurized fuel chamber 158 as the rocker arms pivots down on the tappet, the pressure of the fuel is not increased significantly in the fuel injector assembly and therefore the check valve remains closed. This is true because the fuel is free to flow from the pressurized fuel chamber 158, to the reservoir 160, through the first exhaust passage 162 to the control valve chamber 164 past the open poppet valve member 144, and finally through the second exhaust passage 168 (see arrows 176) to a low pressure fuel reservoir (not shown) via the fuel supply passage in the cylinder head (not shown).

Figure 4:
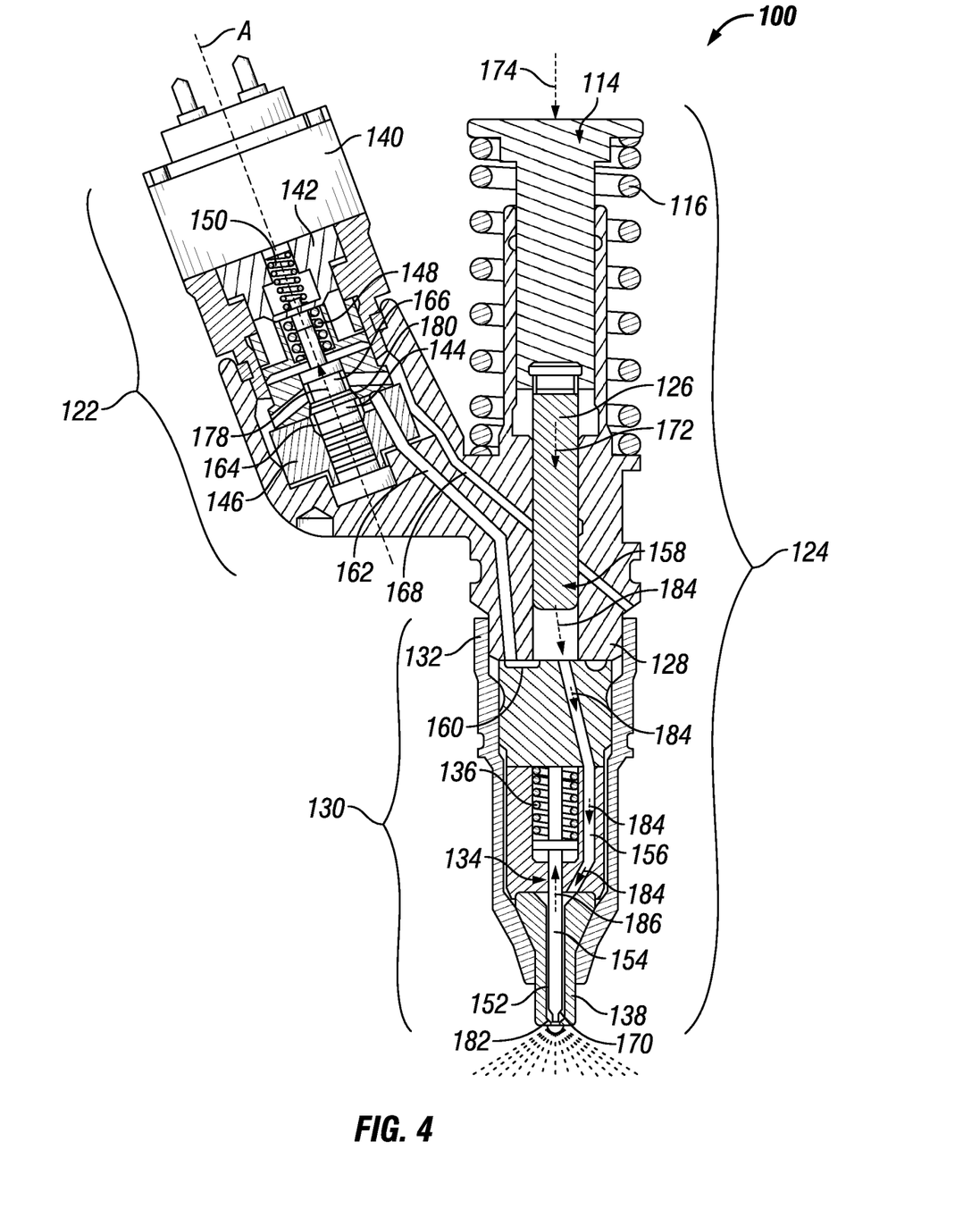
FIG. 4 shows the fuel injector assembly of FIG. 2 in an injection state.

Looking now at FIG. 4, the injection stage and configuration of the fuel injector assembly 100 in this stage is shown. This stage immediately follows the pre-injection stage just described with reference to FIG. 3. As the plunger 126 moves downwardly, the ECM sends a voltage signal to the solenoid 140 of the control valve assembly 122, which creates a magnetic field that attracts the armature 142, moving it upwards against the return spring forces. This causes the other components of the control valve assembly 122 to also move upwards including the poppet valve member 144 (see arrow 178) until it impinges on the poppet valve seat 180 formed by central bore of the valve sleeve member 146. At this time, the poppet valve member 144 is in the closed position blocking any flow of fuel from the first exhaust passage 162 to the poppet valve chamber 164 and to the secondary exhaust passage 168 that leads to the low pressure fuel reservoir (not shown).

Consequently, the plunger 126 and tappet 114 continue to move downwards (see arrows 172, 174), which results in a high pressurization of the fuel in the pressurized fuel chamber 158 of the main injection assembly. This pressure may reach 5 to 10 ksi, which causes the fuel to flow through the feed passage 156 to the injection passage 152 (see arrows 184) with enough force at the angled surface 170 at the tip of the needle 154 of the check valve 134 to overcome the force of the check valve return spring 136, causing the check valve to open by moving the needle away from the needle seat 182 (see arrow 186) and then fuel sprays out of the nozzle tip 138 into the combustion chamber (not shown). This is the start of the injection and continues until the ECM triggers opening of the control valve assembly that stops the injection.

Figure 5:
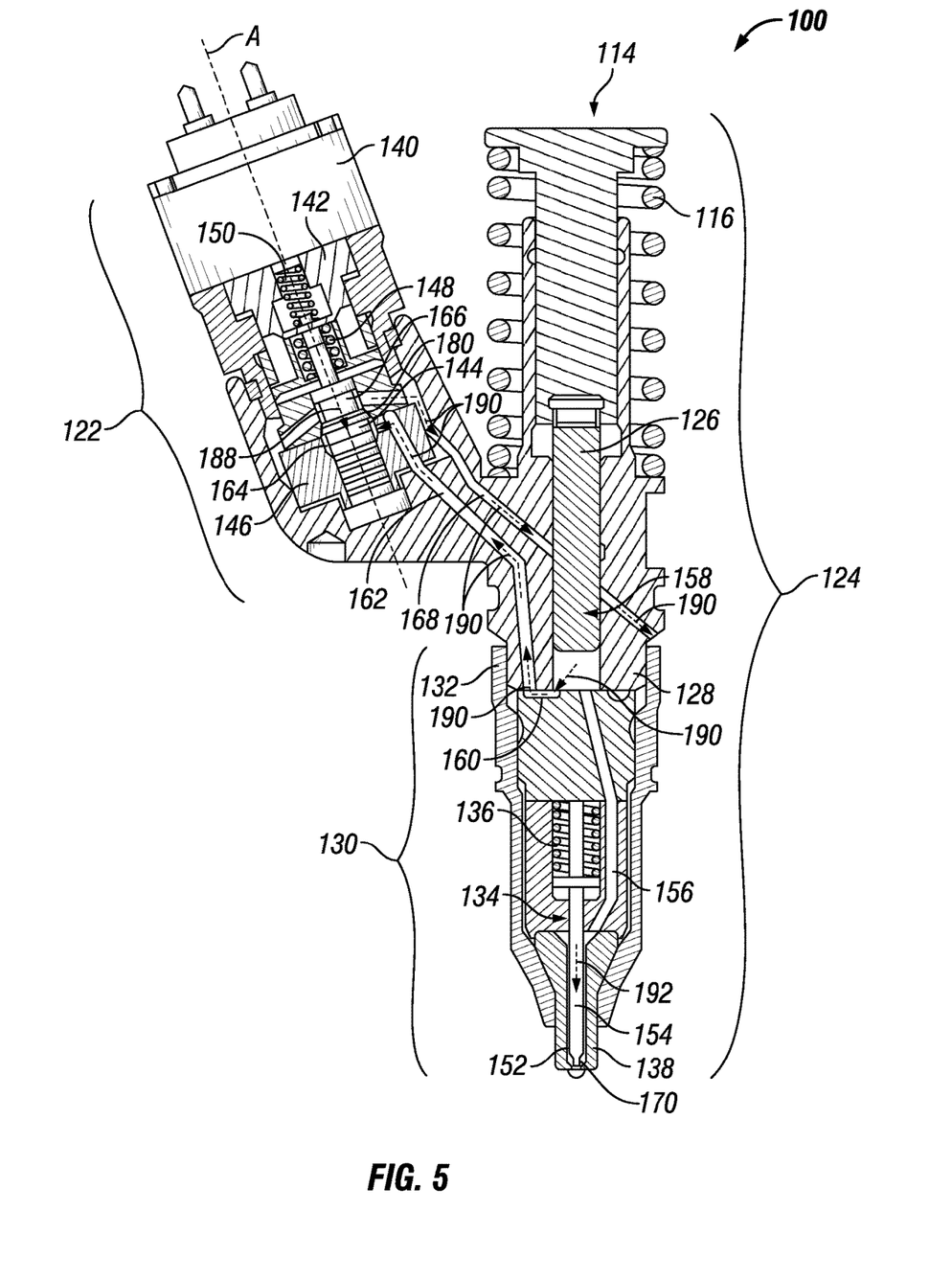
FIG. 5 illustrates the fuel injector assembly of FIG. 2 in an end-of-injection state.

FIG. 5 illustrates the fuel injector assembly 100 in the end of injection stage or configuration. The injection is maintained while the plunger 126 moves downward as explained with reference to FIG. 4 and the energized solenoid 140 keeps the poppet valve member 144 seated against the valve seat 180, that is to say, in a closed configuration. When the ECM determines that injection should be stopped, the voltage signal to the solenoid is reduced to zero. As a result, the magnetic force pulling up on the poppet valve member 144 through the armature 142 and other components therebetween, is removed, allowing the return springs 148, 150 to move the poppet valve member downwards along the longitudinal axis A (see arrow 188). Once the poppet valve member 144 opens by moving away from the valve seat 180, high pressure fuel from the pressurized fuel chamber 158 may flow (see arrows 190) through the reservoir 160, first exhaust passage 162, around the poppet valve member 144 into the control valve chamber 164, second exhaust passage 168, then into the fuel supply passage (not shown) and finally into the low pressure fuel reservoir (not shown).

As a result, a rapid drop of pressure in the main injection assembly 124 occurs and the check valve 134 closes as the needle 154 moves downward (see arrow 192), biased by the check valve return spring 136 and shuts off on the valve seat. This may occur once the injection pressure drops below 5 ksi. This ends the injection stage.

Figure 6:
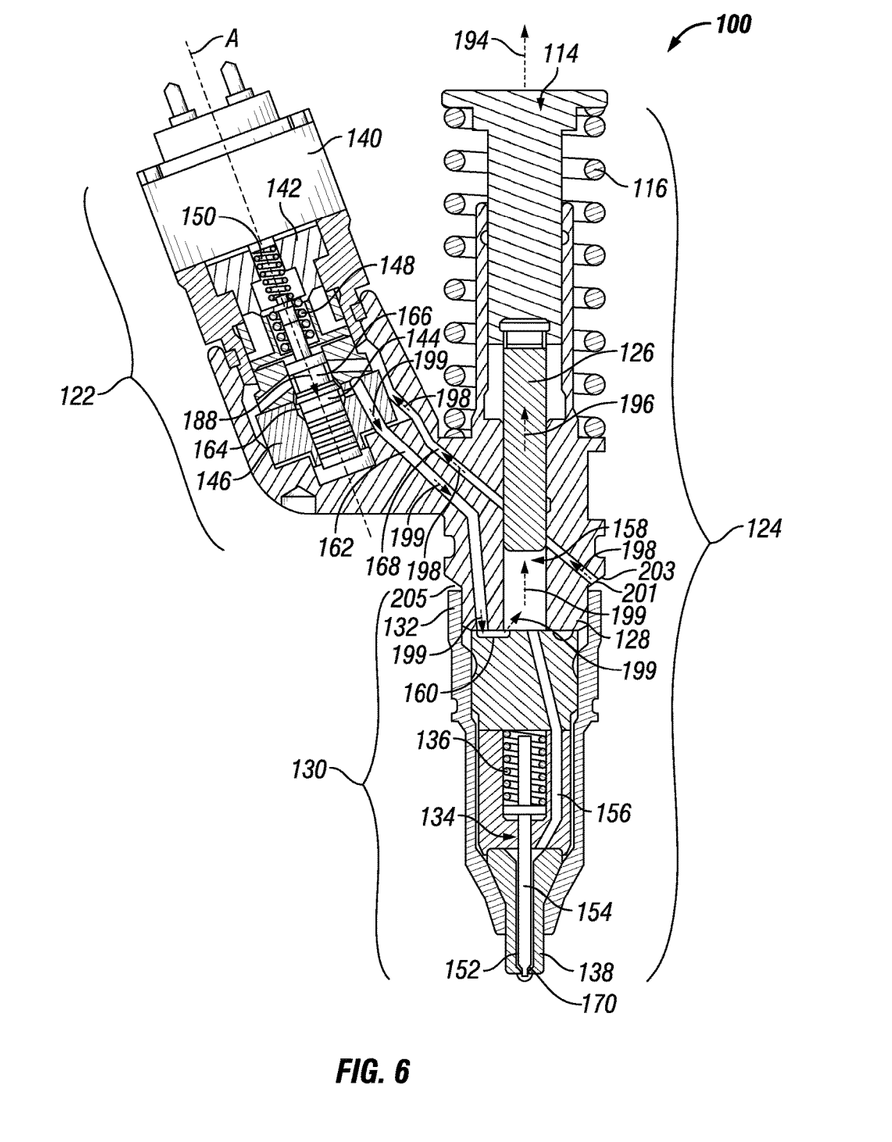
FIG. 6 illustrates the fuel injector assembly of FIG. 2 in a filling state, showing that the fuel inlet is proximate the junction of the tip and body assemblies.

At this point, the pressurized fuel chamber 158 is mostly empty, needing to be refilled. FIG. 6 shows the fuel injector assembly 100 in its fill configuration. The tappet 114 is forced upward (see arrow 194) by the return spring 116 as the third lobe (not shown) is no longer pushing down on the tappet 114. This also causes the plunger 126 to move upward (see arrow 196), causing a vacuum or other pressure that is less than the fuel supply pressure to be present in the pressurized fuel chamber 158. This causes fuel to flow from the fuel reservoir (not shown) through the fuel supply passage (not shown) into the second exhaust passage 168 (see arrows 198). It should be noted that the fuel inlet 201 is formed by the intersection of passage 168 and the chamfered surface 203 of the body 128. The inlet 201 is in fluid communication with the groove 205 created by the junction of the body 128 with the casing 132. As will be discussed shortly, a fuel inlet filter assembly may be disposed in the groove 205, covering the inlet 201 so that contaminants may be kept out of the fuel injector assembly 100.

The fuel fill direction 198 is reversed from the pre-injection direction. Thus, the exhaust passages become fill passages 162, 168. The poppet valve member 144 is in the open position, allowing the fuel to enter the control valve chamber 164, bypass the open poppet valve member 144, and flow into the first fill passage (see arrows 199). Finally, the fuel then enters the reservoir 160 and then the pressurized fuel chamber 158. This continues until the plunger 126 and tappet 114 reach their topmost position. The fuel injector assembly 100 is now ready for the cycle to repeat itself starting with the pre-injection stage.

It should be noted that the pressurized fuel chamber in this embodiment is pressurized mechanically by the plunger, tappet and cam shaft. However, this pressurization may be caused by a plunger moved hydraulically. In yet other embodiments, this pressurization may achieved by providing direct fluid communication between the pressurized fuel chamber and a high pressure fuel source such as a common rail, etc.

Figure 7:
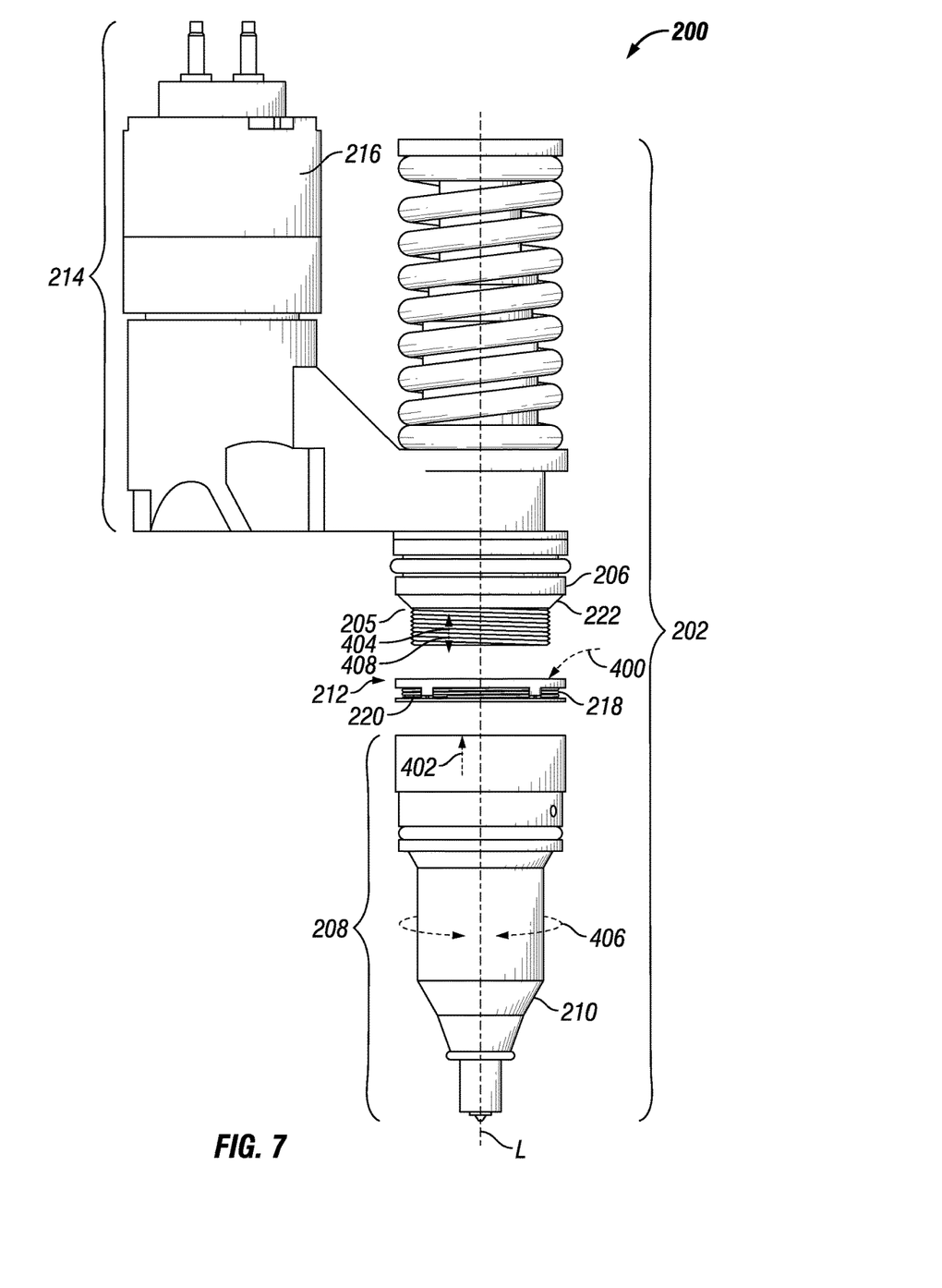
FIG. 7 is a front view of a partially exploded mechanically pressurized fuel injector similar in operation and construction as the fuel injector of FIGS. 1 thru 6 with the nozzle assembly shown disassembled from the body assembly with a fuel inlet filter assembly shown between the nozzle and body assemblies, ready to be compressed between the nozzle and body assemblies as the nozzle assembly is screwed onto the body assembly.
Figure 8:
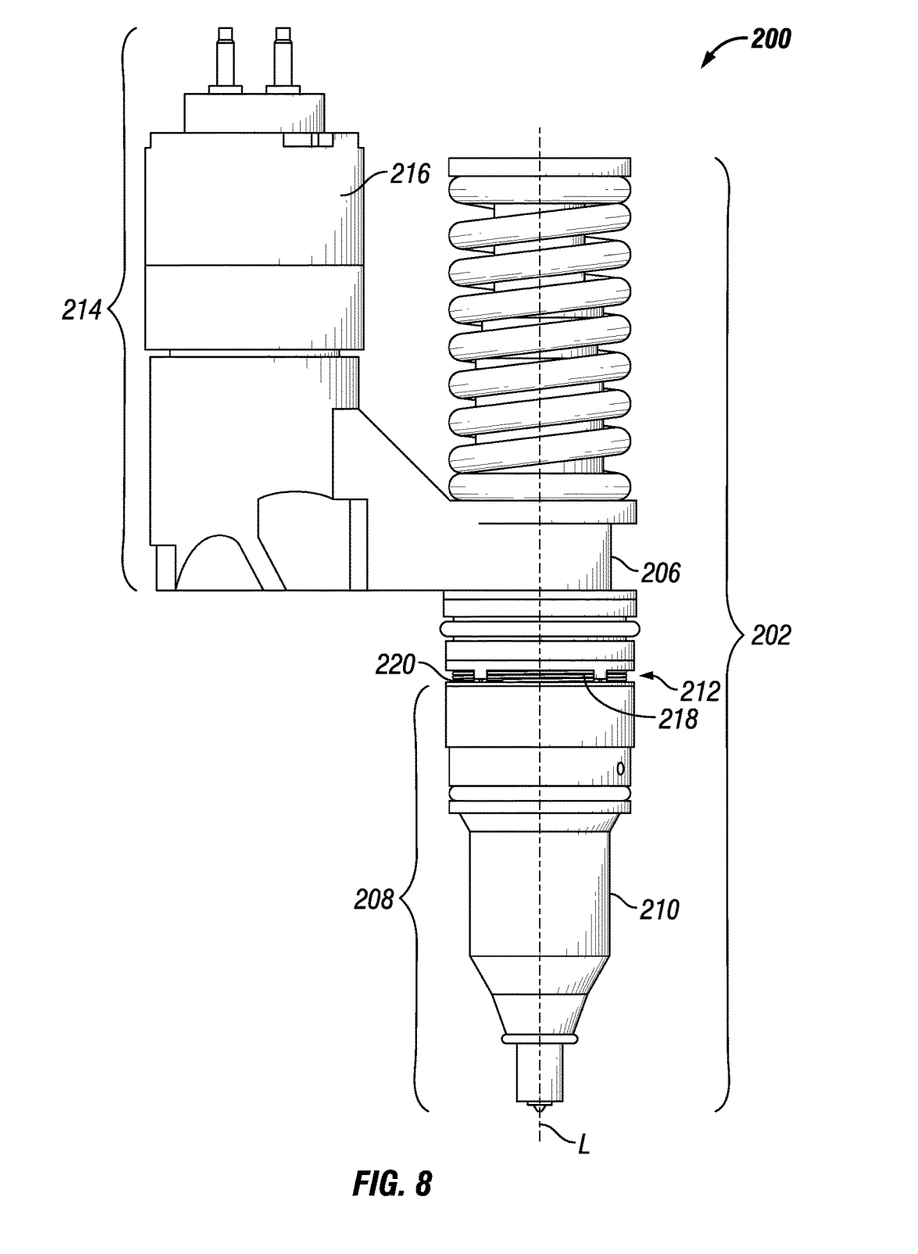
FIG. 8 is a front view of the fuel injector of FIG. 7 with the nozzle assembly completely assembled onto the body assembly with the fuel inlet filter assembly placed at the junction between the nozzle and body assemblies.

Turning the reader's attention now to FIGS. 7 and 8, a fuel injector assembly that includes a construction and operation similar to, but not necessarily, identical to what has been previously described with reference to FIGS. 1 thru 6 may use an axially adjustable fuel filter assembly similar to what is depicted in FIGS. 7 and 8. The fuel injector assembly 200 comprises a main injection assembly 202 that defines a pressurized fuel chamber 204 (see FIG. 11) and that includes a body 206 that defines a longitudinal axis L. The fuel injector assembly 200 also comprises a nozzle assembly 208 that includes a check valve assembly (see 134 of FIG. 6) and a casing 210 that surrounds the check valve assembly, wherein the casing 210 is threadedly attached to the body 206 forming a junction (see groove 205 in FIG. 6). While not shown in these figures, an inlet is disposed in this junction in a similar manner as what has just been described with reference to FIG. 6.

Consequently, an axially adjustable fuel filter assembly 212 is disposed proximate the junction of the casing 210 and the body 206 in FIGS. 7 and 8, covering the inlet to filter fuel before it enters the fuel injector assembly 200. The fuel injector assembly 200 further comprises a control valve assembly 214 that includes a valve actuating mechanism 216 for controlling the injection of fuel into the combustion chamber as was discussed previously with reference to FIGS. 1 thru 6.

As will be discussed in greater detail with reference to FIGS. 9 thru 11 later herein, FIGS. 7 and 8 depict that the axially adjustable fuel filter assembly 212 includes a resilient member 218 and a flexible filter mesh 220 that are operatively connected to each other and that are configured to expand or contract along the axial direction L of the body 206. As can best be seen in FIG. 11, the body 206 defines a chamfered surface 222 that forms an oblique angle α with the longitudinal axis L and the axially adjustable fuel filter assembly 212 further comprises an upper housing 224 and a seal 226 that contacts the upper housing 224 and the chamfered surface 222 of the body 206, preventing fuel from bypassing the flexible filter mesh and getting into the fuel injector assembly unfiltered. A similar seal may be provided with the lower housing or no seals may be provided for other embodiments.

Figure 9:
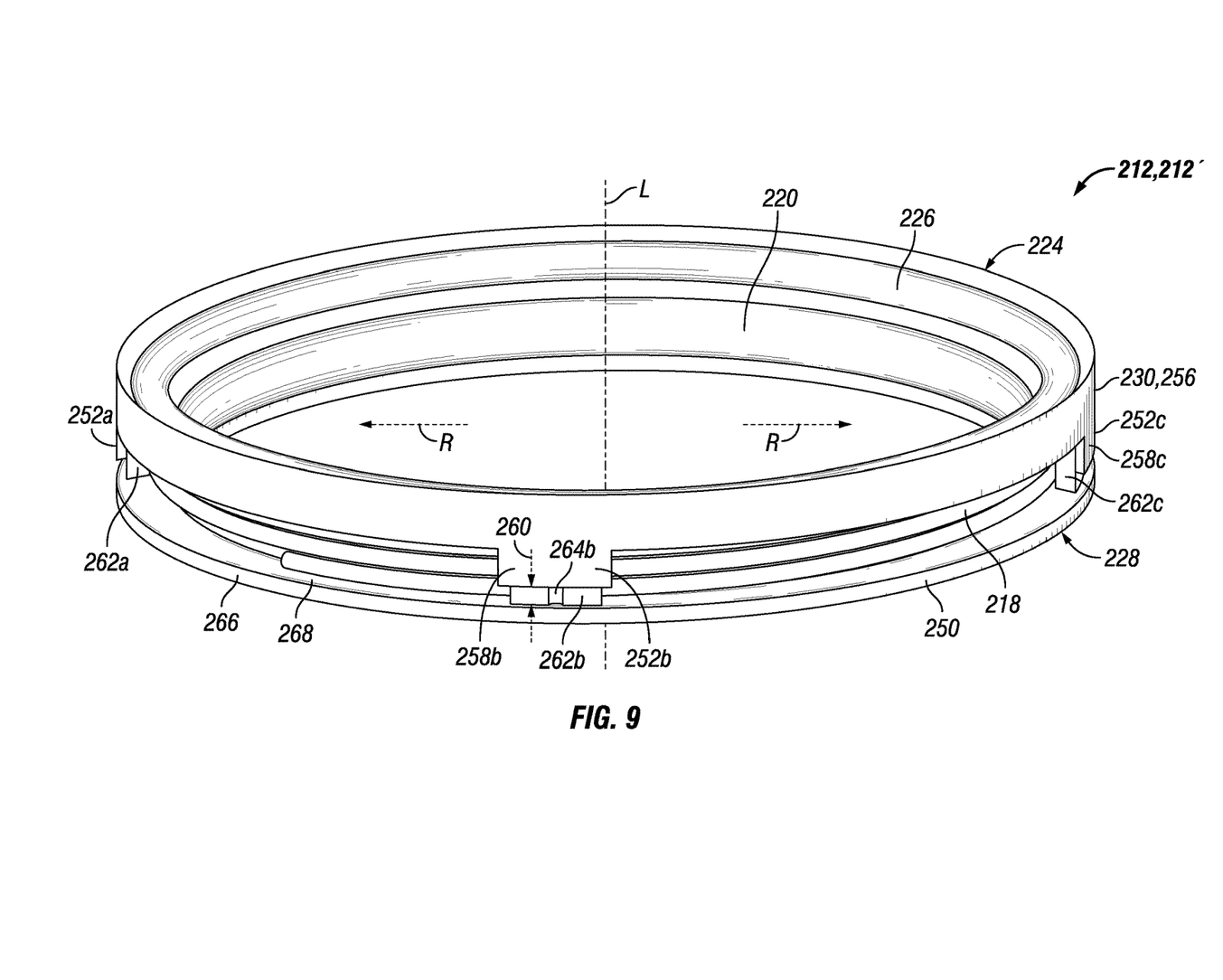
FIG. 9 is a perspective view of the fuel inlet filter assembly of FIG. 8.
Figure 10:
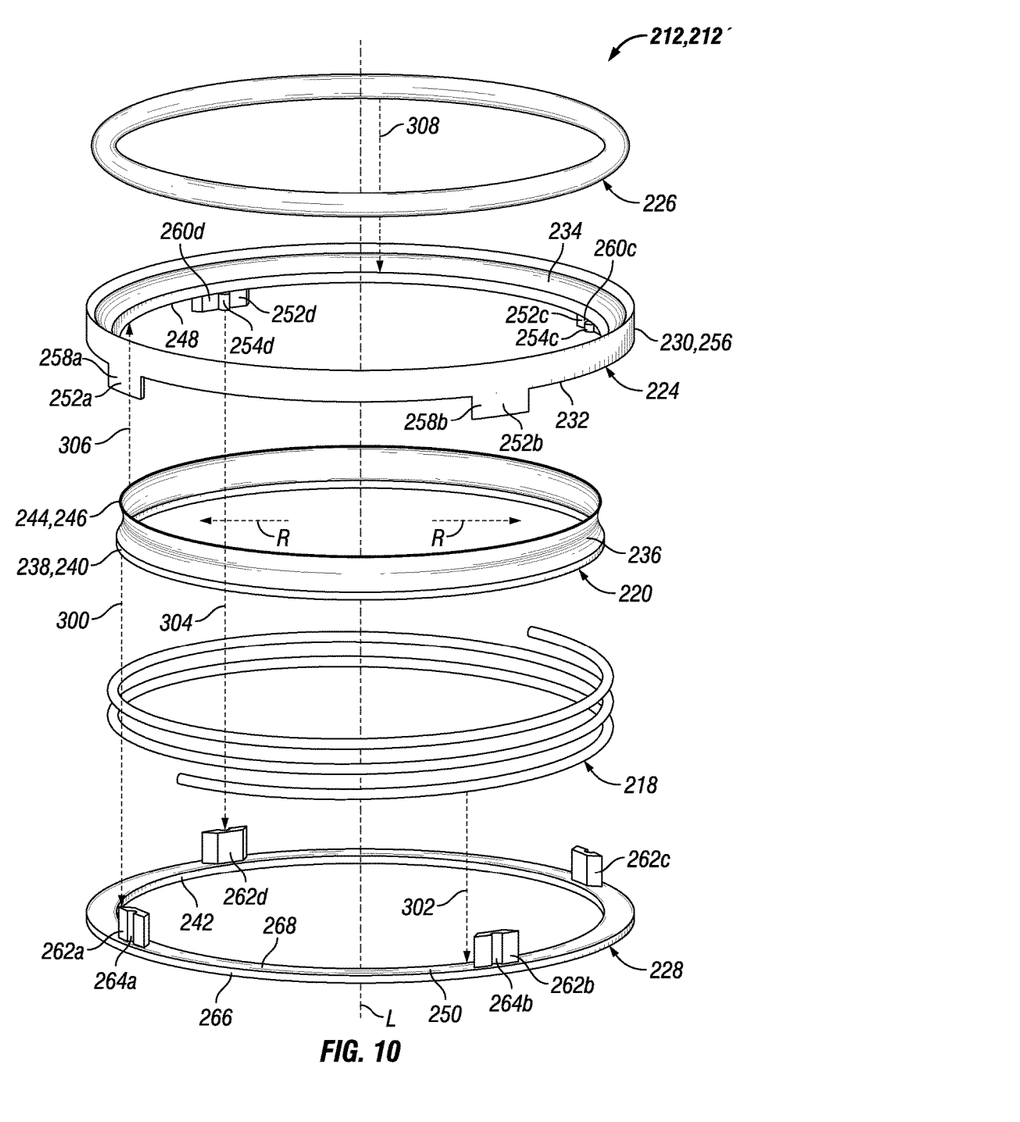
FIG. 10 is an exploded assembly view of the fuel inlet filter assembly of FIG. 9.

FIGS. 9 and 10 show the axially adjustable fuel filter assembly 212 isolated from the fuel injector assembly. While this assembly is intended in many embodiments herein to be used as a fuel inlet filter, it is to be understood that it may be used as a fluid filter assembly that may be used in a variety of applications not involving fuel or fuel injectors. As such, the fluid filter assembly 212 is shown in FIGS. 9 and 10 to comprise an upper housing 224, a lower housing 228, a resilient member 218 that is operatively connected to the upper and lower housings 224, 228 and that is configured to bias the upper and lower housings apart, and a flexible filter mesh 220 that is operatively connected to the lower and upper housing 228, 224 and that is configured to filter a fluid that passes between the lower and upper housings 228, 224.

As used herein, the term "upper" means closer to the body 206 of the fuel injector and the term "lower" means closer to the nozzle tip (see 138 of FIG. 6) of the fuel injector, regardless of the orientation of the fuel injector or fluid filter relative to any horizontal or vertical planes for a particular application.

Figure 11:
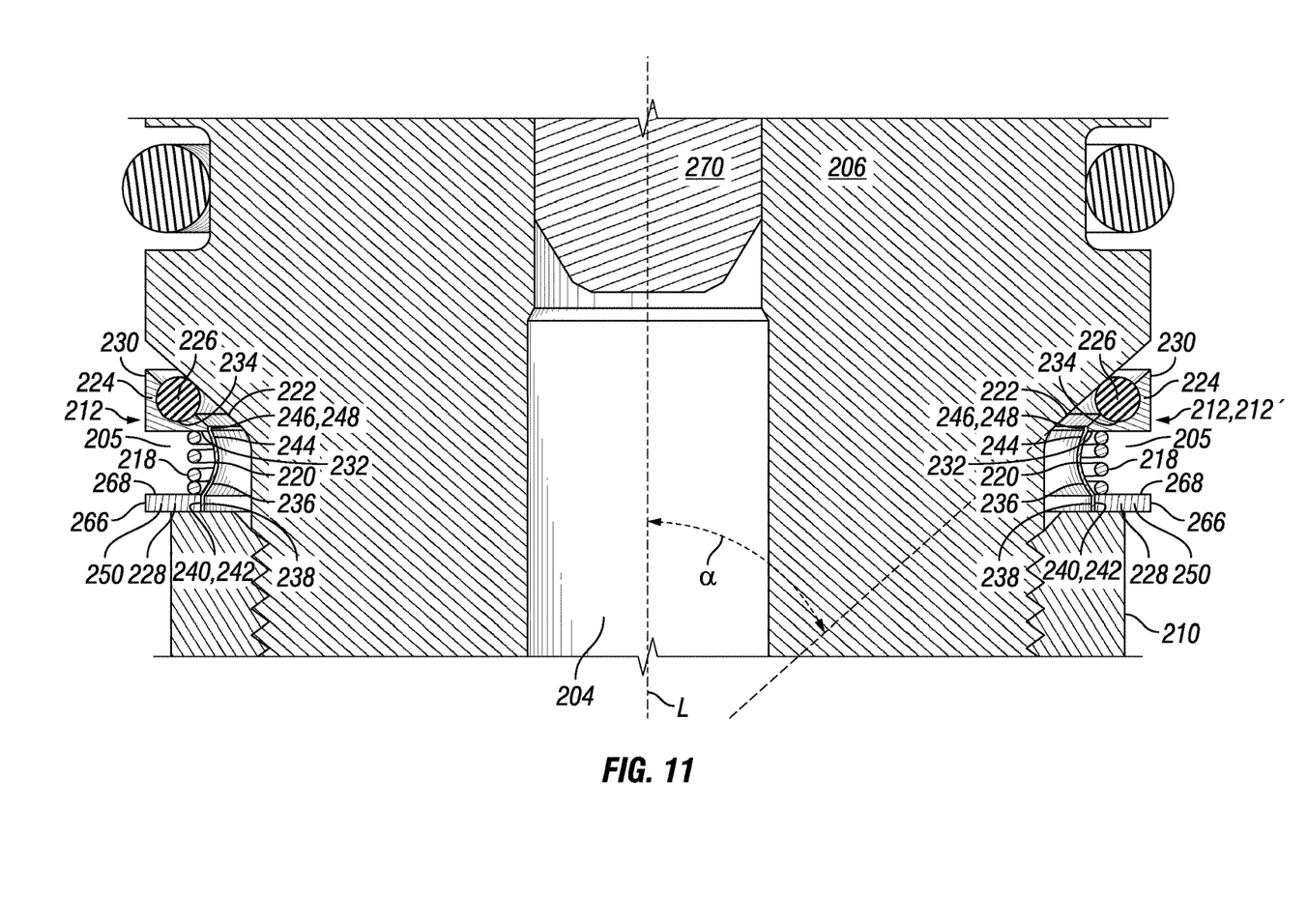
FIG. 11 is an enlarged sectional view of the fuel injector of FIG. 8 showing more clearly how the fuel inlet filter assembly fits into the groove located between the junction of the nozzle and body assemblies.

In the embodiment shown in FIGS. 9 thru 11, the fluid filter assembly further comprises a seal 226 and the upper housing 224 is at least partially complimentary configured to receive the seal 226. More specifically, the upper housing 224 includes a wall 230 that extends from the base ring portion 232 in the axially upward direction and the wall 230 defines a seal receiving groove 234. For this embodiment, the seal comprises a standard O-ring construction but other configurations and constructions are possible.

The resilient member 218 and the flexible filter mesh 220 are disposed between the upper and lower housings 224, 228. More particularly, the assembly 212 defines a generally circularly annular configuration that defines a longitudinal axis L and a radial direction R, wherein the resilient member 218 is positioned radially outward from the flexible filter mesh 220. It is contemplated that this spatial relationship may be reversed for other embodiments. For this embodiment, the resilient member 218 is a coil compression spring but the resilient member may be a rubber component, a wave or disc spring, etc. in other embodiments. The flexible filter mesh 220 may be connected directly to the upper and lower housings 224, 228, limiting how far the spring may force the upper and lower housings 224, 228 apart axially. A compression force exerted on the housings that is greater than the spring force will cause the housings to approach each other. At the same time, the preformed concave intermediate portion 236 of the filter mesh 220 will bow further radially inward.

Looking more closely at the flexible filter mesh 220 as best seen in FIGS. 10 and 11, the flexible filter mesh 220 includes a lower ring portion 238 that defines a cylindrical surface 240 that faces radially outwardly that is configured to be bonded to a complimentarily shaped surface 242 of the lower housing 228. Similarly, the flexible filter mesh 220 includes an upper ring portion 244 that defines a smaller cylindrical surface 246 that also faces radially outward and that is configured to be bonded to a complimentarily shaped surface 248 of the upper housing 224.

Referring to FIGS. 9 and 10, the upper housing 224 comprises a base ring portion 232 and a plurality of legs 252 that extend from the base ring portion 232 in a downward axial direction that each includes an interlocking feature 254. The base ring 232 defines a cylindrical surface 256 that faces in a radially outward direction and each of the legs 252 defines a surface 258 that is coextensive with the cylindrical surface 256. In other words, the legs are immediately adjacent the outer perimeter of the base ring. Furthermore, each leg 252 defines a surface 260 that faces in a radially inward direction and the interlocking feature 254 is disposed on the inwardly facing surface 260 and the interlocking feature 254 is a male feature that may have any suitable shape in the radial and axial planes. For this embodiment, the interlocking male feature has a curved shape or radiused shape.

Likewise, the lower housing 228 comprises a base ring portion 250 and a plurality of legs 262 that extend from the base ring portion 250 in an axially upward direction and that each includes an interlocking feature 264. The base ring 250 defines a cylindrical surface 242 that faces in a radially inward direction, a cylindrical surface 266 that faces in a radially outward direction, and a flat annular surface 268 that connects the inwardly facing and outwardly facing cylindrical surfaces 242, 266. The legs 262 are positioned on the flat annular surface 268 between the inwardly facing and outwardly facing cylindrical surfaces 242, 266 and are configured to mate with the inside surfaces of the legs 252 of the upper housing 224. The interlocking features 264 of the legs 262 of the lower housing 228 are female interlocking features 264 positioned on the outwardly radially facing surface of each leg, which are complimentarily shaped to receive the male interlocking features 254 of the legs 252 of the upper housing 224, preventing torsion or rotation of the upper and lower housings 224, 228 circumferentially relative to each other about axis L. This helps prevent tearing or other damage from occurring to the flexible filter mesh 220.

The configurations and spatial relationships of the various legs and interlocking features may be varied as desired or needed. For example, the legs of the upper housing and interlocking features of these legs may be swapped with the legs and interlocking features of the legs of the lower housing. The legs 252, 262 of the upper or lower housing 224, 228 are configured to contact the other of upper or lower housing 224, 228, limiting the amount of compression or contracting of the spring 218 and flexible filter mesh 220, helping to prevent damage or permanent deformation. The extent of the axial movement of the filter is represented by distance 260 shown in FIG. 9.

Focusing now solely on FIG. 11, the body 206 defines the pressurized fuel chamber 204, which contains a plunger 270 that pressurizes the fuel in a manner similar to what has been discussed previously with respect to FIGS. 1 thru 6. However, other fuel injectors that use other methods for pressurizing the fuel may use a fluid filter assembly as shown and described herein with respect to FIGS. 7 thru 11.

As can be appreciated by looking at FIGS. 9, 10 and 11 together, the spring 218 is positioned between the flexible filter mesh 220 and the legs 262 of the lower housing 228 while the flexible filter mesh 220 is positioned nearest the longitudinal axis L of the assembly 212 as compared to any other component of the assembly. As a result, the spring 218 is trapped in the assembly 212 and the flexible filter mesh 220 is free to move radially inwardly unimpeded as the intermediate concave section 236 bows radially inwardly as the assembly 212 is compressed as the casing 210 is screwed onto the body 206. Other configurations and spatial relationships between these various components are possible and are considered to be within the scope of the present disclosure.

INDUSTRIAL APPLICABILITY

In practice, a fluid filter assembly that uses any of the embodiments described herein may be provided, sold, manufactured, bought etc. to refurbish or remanufacture existing fuel injector assemblies to help limit the problem of fuel contamination from adversely affecting the performance of the fuel injector. Similarly, a fuel injector assembly may also be provided, sold, manufactured, bought, etc. to provide a fuel injector that is less prone to the problems associated with fuel contamination than has been yet made available to the public. The fuel injector assembly may be new or refurbished, remanufactured, etc. using any of the embodiments of a fluid filter assembly or fuel filter assembly as described or shown herein. The fluid filter assembly may be used anywhere in the fuel injector, including but not limited to, near the fuel inlet.

Referring back to FIGS. 9 and 10, a fluid filter assembly 212' may be manufactured and assembled in the following manner. First, each of the component parts may be made or purchased, etc. For example, the upper and lower housing 224, 228 may be made from plastic using plastic injection molding. Second, a seal 226 such as an O-ring may be made or purchased, etc. For example, the O-ring could be made from an elastomer using an injection process. Third, the flexible filter mesh 220 may be made or purchased, etc. For example, the flexible filter mesh 220 may be made from a plastic film that has small holes in it using a process that is known or that will be devised in the art. Finally, the compression coil spring 218 may be made from metal or may be purchased, etc. The constructions, configurations and methods of obtaining any of these components may be varied as needed or desired.

The fluid filter assembly may be assembled as follows as depicted by FIG. 10. First, the flexible filter mesh 220 is bonded to the lower housing 228 in a manner previously described (see step 300 in FIG. 10). Second, the coil spring 218 is inserted into the space found radially between the flexible filter mesh 220 and the legs 262 of the lower housing 228 (see step 302). Third, the upper housing 224 is lowered onto lower housing 228 such that its interlocking features 254 mate with the interlocking features 264 of the lower housing 228 (see step 304). At about the same time or shortly thereafter, the flexible filter mesh 220 is bonded to the upper housing 224 (see step 306). Finally, the O-ring 226 is inserted into the groove 234 of the upper housing 224 (see step 308). At this time, the fluid filter assembly 212' is ready to be assembled onto a fuel injector assembly 200 or another apparatus that needs a fluid to be filtered as shown by FIG. 9. The bonding of the flexible filter mesh to a housing may be achieved using an adhesive or any other suitable method or device that is known or that will be devised in the art.

Referring back now to FIG. 7, a method for compensating for a variable distance between two components of an apparatus for providing a fluid filtering device therebetween is depicted. The method comprises placing an adjustable filtering device 212, 212' between two components (for example body 206, casing 210) (see step 400 in FIG. 7), altering the distance between the two components (see step 402), and compensating for the change in the distance between the two components by varying a dimension of the adjustable filtering device (see step 404).

For the particular embodiment shown in FIG. 7, the method is used for a fuel injector and a fuel filter assembly but this method may be used for any apparatus that may use any type of an adjustable filtering device. Also, the fuel injector involves the use of threads (see FIG. 11) to affect a change in the axial distance between the body and casing and the axial dimension of the filter assembly. Therefore, the altering step 402 includes screwing one component onto another component until a torque threshold is reached (see step 406 in FIG. 7), and the compensation step 404 includes expanding or contracting the adjustable filtering device 212, 212' using a resilient member 218 that is configured to bias components of the adjustable filtering device apart (see step 408). It is contemplated that the compensation step 404 may be achieved using a threaded connection instead of a spring, etc. It is further contemplated that the altering step 402 may be achieved using a ratcheting system, etc. In some cases, the altering step 402 may include screwing the component in either or both directions. For example, the user may inadvertently overtighten or over torque the casing 210 onto the body 206 requiring the user to reverse direction to achieve the desired torque.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A fluid filter assembly comprising:
   an upper housing;
   a lower housing;
   a resilient member that is operatively connected to the upper and lower housings and that is configured to bias the upper and lower housings apart; and
   a flexible filter mesh that is operatively connected to the lower and upper housing and that is configured to filter a fluid that passes between the lower and upper housings, wherein
   the lower housing comprises a base ring portion and a plurality of legs that extend from the base ring portion in an axially upward direction and that each includes an interlocking feature, and
   the base ring defines a cylindrical surface that faces in a radially inward direction, a cylindrical surface that faces in a radially outward direction, a flat annular surface that connects the inwardly facing and outwardly facing cylindrical surfaces, and wherein the legs are positioned on the flat annular surface between the inwardly facing and outwardly facing cylindrical surfaces.

2. The fluid filter assembly of claim 1 further comprising a seal.

3. The fluid filter assembly of claim 2 wherein the upper housing is at least partially complimentary configured to receive the seal.

4. The fluid filter assembly of claim 2, wherein the resilient member and the flexible filter mesh are disposed between the upper and lower housings.

5. The fluid filter assembly of claim 4 wherein the assembly defines a generally circularly annular configuration that defines a longitudinal axis and a radial direction, wherein the resilient member is positioned radially outward from the flexible filter mesh.

6. The fluid filter assembly of claim 1, wherein the resilient member is a coil compression spring.

7. The fluid filter assembly of claim 1 wherein the flexible filter mesh includes a ring portion that defines a cylindrical surface that faces radially outwardly and that is configured to be bonded to the lower housing.

8. The fluid filter assembly of claim 1 wherein the flexible filter mesh includes a ring portion that defines a cylindrical surface that faces in an outwardly radial direction and that is configured to be bonded to the upper housing.

9. The fluid filter assembly of claim 1 wherein the upper housing comprises a base ring portion and a plurality of legs that extend from the base ring portion in a downward axial direction that each includes an interlocking feature.

10. The fluid filter assembly of claim 9 wherein the base ring defines a cylindrical surface that faces in a radially outward direction and each of the legs defines a surface that is coextensive with the cylindrical surface.

11. The fluid filter assembly of claim 9 wherein each leg defines a surface that faces in a radially inward direction and the interlocking feature is disposed on the inwardly facing surface and the interlocking feature is a male feature.

12. The fluid filter assembly of claim 9 wherein the upper housing includes a wall that extends from the base ring portion in the axially upward direction and the wall defines a seal receiving groove.

13. The fluid filter assembly of claim 1 wherein each of the legs defines an outwardly radially facing surface that defines a female interlocking feature.

* * * * *